United States Patent
Depaola et al.

(10) Patent No.: US 7,125,604 B2
(45) Date of Patent: Oct. 24, 2006

(54) INSULATED MAGNET WIRE

(75) Inventors: Joseph P. Depaola, Beaverdam, VA (US); Prentice Lee Ralston, Jr., Spotsylvania, VA (US)

(73) Assignee: R & A Magnet Wire Co., Fort Wayne, IN (US)

( * ) Notice: Subject to any disclaimer, the term of this patent is extended or adjusted under 35 U.S.C. 154(b) by 110 days.

(21) Appl. No.: 10/818,218

(22) Filed: Apr. 5, 2004

(65) Prior Publication Data

US 2005/0221086 A1    Oct. 6, 2005

(51) Int. Cl.
*D02G 3/00*    (2006.01)
*H01B 7/04*    (2006.01)

(52) U.S. Cl. ............... 428/379; 428/375; 174/110 FC; 174/117 F; 174/117 FF; 174/117 R; 427/117; 427/118; 427/120

(58) Field of Classification Search ............... 428/375, 428/379; 174/117, 110 FC, 36, 110 R, 117 F, 174/117 FF, 115, 117 R, 127, 129 R, 129 S
See application file for complete search history.

(56) References Cited

U.S. PATENT DOCUMENTS

| | | | | |
|---|---|---|---|---|
| 3,842,193 | A * | 10/1974 | Johnson ................. | 174/120 C |
| 5,151,147 | A * | 9/1992 | Foster et al. ........... | 156/244.12 |
| 5,281,488 | A * | 1/1994 | Poulsen .................... | 428/624 |
| 5,679,232 | A * | 10/1997 | Fedor et al. .............. | 205/77 |
| 5,998,027 | A * | 12/1999 | Onishi et al. ............. | 428/379 |
| 6,179,988 | B1 * | 1/2001 | Peckham et al. ......... | 205/580 |
| 6,288,342 | B1 * | 9/2001 | Ueoka et al. ............ | 174/137 B |
| 6,568,583 | B1 * | 5/2003 | Yumi et al. .............. | 228/180.5 |
| 6,925,703 | B1 * | 8/2005 | Harada et al. ............ | 29/605 |

* cited by examiner

*Primary Examiner*—Jill Gray

(57) ABSTRACT

A novel polymer coated magnet wire that includes an insulating polymeric coating on only one facet thereof. Such a magnet wire can be conventionally wound using current transformer manufacturing processes but can be produced at significantly lower cost due to the almost 75% reduction in the volume of insulating polymeric material applied to the magnet wire core as compared to similar prior art such products. The method provides for the application of the insulating polymeric coating to only a single minor axis facet of the magnet wire core through the use of custom dies and a modified manufacturing process.

6 Claims, 3 Drawing Sheets

INSULATED MAGNET WIRE

FIELD OF THE INVENTION

The present invention relates to coated magnet wire of the type used to wind electrical transformers and more particularly to such wire that is coated with an insulating polymeric layer on only one facet thereof.

BACKGROUND OF THE INVENTION

U.S. Pat. No. 5,151,147 issued Sep. 29, 1992 describes a method and apparatus for the production of, among other continuous elongated articles, a coated magnet wire of the type used in the winding of electrical transformers. The product produced by the apparatus and method described in that patent comprises a conductive core, preferably of a metal such as copper or aluminum, surrounded by an adherent layer of an insulating polymer. In the production of transformers, multiple layers of this coated magnet wire are concentrically wound with paper or other insulating material interleaves between the sequential layers to form the core of an electrical transformer.

While the magnet wire produced by this system has proven entirely adequate and to a certain extent revolutionized the production of magnet wire based transformer systems, it can be relatively expensive to produce. The cost of such a product is in large extent affected by the cost of the polymer applied about the metallic core. This is particularly so in the case of high temperature transformers (operating temperature on the order of 200° C. or more) where the applied polymer is a so-called engineering polymer. Such materials while exhibiting excellent insulating and heat resistance properties are quite costly vis-à-vis lower temperature capability insulating polymers or other competitive insulating products.

Accordingly means to reduce the amount of polymer used in the insulating layer have been sought after for many years. The most obvious and generally simplest approach to achieving such polymer material volume reduction is, of course applying a thinner layer (on the order of 2–3 mils) of the insulating polymer. While these approaches have been successful in reducing the amount/volume of insulating polymer applied to the magnet wire to a minimum, attempts to further reduce the thickness of such coatings have, for all practical purposes, stressed the limits of the manufacturing process to further reduce the thickness of the polymeric insulating layer. Additionally, the currently applied insulating polymers have substantially reached the limits of their dielectric strength at current levels/thicknesses of application. Thus, practically, there is no currently known way to further reduce the thickness of such layers within the currently known manufacturing processes and with the currently available materials.

There thus exists a need for a method of further reducing the amount of applied insulating polymer in such products to further reduce the costs inherent in the production thereof.

OBJECTS OF THE INVENTION

It is therefore an object of the present invention to provide a method and apparatus for the production of a polymer coated insulated magnet wire that performs in a manner equivalent to prior art such magnet wire products with a significantly reduced requirement for insulating polymer coating volume.

It is another object of the present invention to provide an insulated magnet wire that, while performing equivalently to prior art products in transformer winding processes, utilizes a significantly reduced amount of the insulating polymer.

SUMMARY OF THE INVENTION

According to the present invention, there is provided a novel continuously coated magnet wire that includes an insulating polymeric coating on only one facet thereof. Such a magnet wire can be conventionally wound using current transformer manufacturing processes but can be produced at significantly lower cost due to the almost 75% reduction in the volume of insulating polymeric material applied to the magnet wire core. A method for the manufacture of such a product provides for the application of the insulating polymeric coating to only a single minor axis facet of the magnet wire core through the use of custom dies and a modified manufacturing process that allows for conventional handling and packaging of the modified product.

DETAILED DESCRIPTION

Figure 1:
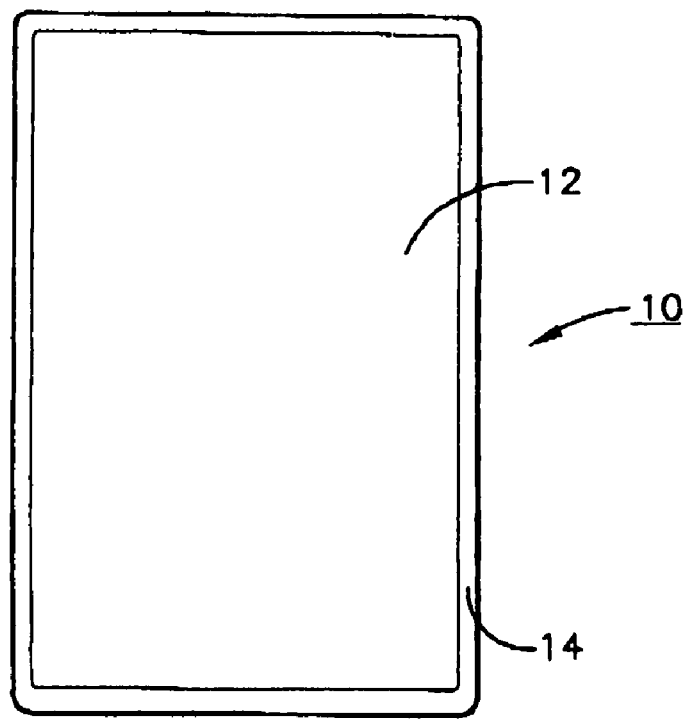
FIG. 1 is a greatly enlarged cross-sectional view of the polymer coated magnet wire of the prior art.

Referring now to the accompanying drawings, FIG. 1 shows a greatly enlarged cross-sectional view of the magnet wire 10 of the prior art. The magnet wire products described herein generally have cross-sectional dimensions below about one inch by one inch, but have been enlarged in the accompanying Figures so that details thereof can be more easily seen. As can be seen in FIG. 1, prior art magnet wire 10 comprises a metallic/conductive core 12 with a continuous layer 14 of polymeric insulating material completely about its periphery. Such is the product that was manufactured in accordance with the practice of the invention described in U.S. Pat. No. 5,151,147 previously described (hereinafter the '147 patent) and which is incorporated herein by reference in its entirety particularly as it describes details of the continuous metal extrusion and polymer coating process. While such a product possesses entirely adequate properties for its intended use, its production cost shortcomings, as described above, make it less than ideal for continued use, particularly in lower temperature capability/lower cost transformer applications.

Figure 2:
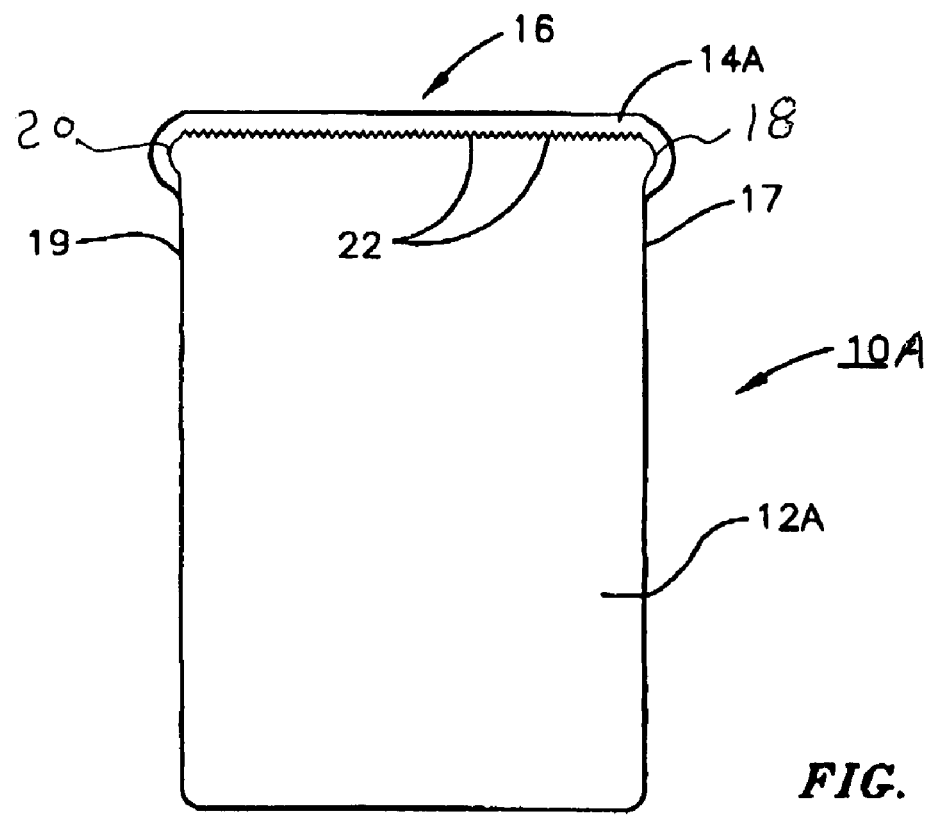
FIG. 2 is a greatly enlarged cross-sectional view of the polymer coated magnet wire of the present invention.

Referring now to FIG. 2 that depicts an enlarged cross-sectional view of the improved coated magnet wire 10A of the present invention, it is apparent that the insulating polymer coating 14A over the metallic/conductive core 12A is present on only one facet, one of the minor axis facets, 16 of metallic core 12A, and at about the same thickness as used in the prior art embodiment depicted in FIG. 1. As used herein, the terms "minor axis", "minor axis facet", "minor axis surface" and "minor axis extremty(ies)" are all clearly meant and intended to mean the short dimensions and/or side(s) of the generally rectangular magnet wire product 10A described herein. In the case of a square wire, the minor axes and major axes extremities will be equal in size. In such a case, the term "minor axis extremity", or the like, is intended to mean one of such equal sides. A comparison of this structure 10A (having a polymer coating on only one minor axis extremity thereof) with that depicted in FIG. 1, namely structure 10, immediately reveals that the amount of insulating polymer used in the case of wire 10A is on the order of less than about 25% by volume of that used on wire 10 as depicted in the embodiment of FIG. 1. It is this saving of polymeric coating that forms the basis for the advantages of the present invention.

As described in the '147 patent, the continuous extrusion and coating process comprises extruding a product shape by the action of a rotary extrusion press forcing input metal through a metal forming die, in our current case the shape is a metallic/conductive generally rectangular magnet wire 10A, cooling the wire and then passing the cooled wire through a die for extruding polymer. In the case described in the '147 patent, the polymer extrusion die is of an annular shape and extends around the entire periphery of the elongated shape or wire 12 so that the central axis of the polymer extrusion die coincides with the central axis of the path of the wire 12 as it is drawn from the metal extrusion die to a take up reel.

In accordance with the present invention, the metal extrusion die instead of forming a purely rectangular wire (as shown at 12 in FIG. 1) forms the shape depicted for the core 12A depicted in FIG. 2. This shape includes at one minor axis extremity 16 of the cross section of the extruded wire 12A, a pair of shoulders 18 and 20. According to a preferred embodiment of the wire of the present invention, shoulders 18 and 20 extend, stand off, on the order of from 2 to about 4 thousandths from surfaces 17 and 19 of core 12A respectively. The purpose of these shoulders will be described in greater detail hereinafter.

Figure 3:
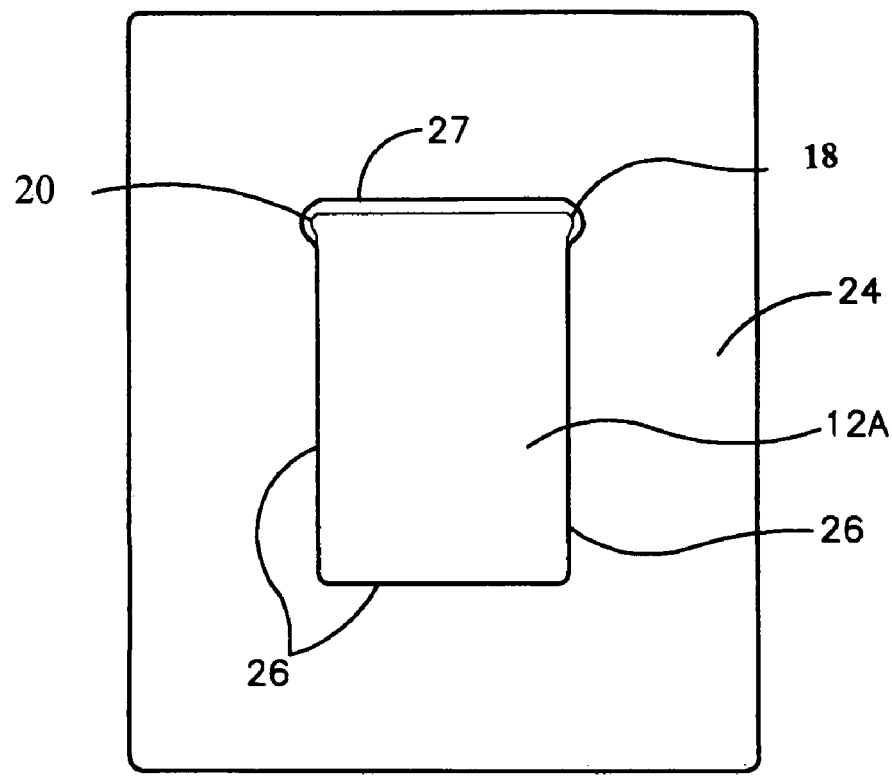
FIG. 3 is a cross-sectional view showing the conductive core of the magnet wire of the present invention as it passes through a die for the application of the polymeric insulating material to a minor axis facet or extremity thereof in accordance with the present invention.

Referring now to FIG. 3 that depicts a cross-sectional view of extruded core 12A as it passes through polymer extrusion die 24, it can be seen that polymer extrusion die 24 in lower region 26 thereof abuts closely to core 12A eliminating the application of any polymer in this region while in the area of polymer extrusion die 24 that abuts minor axis extremity 16, i.e. area 27, polymer is extruded in the general shape depicted for minor axis extremity 16 depicted in FIG. 2, resulting in the selective application of an appropriate thickness of polymer to minor axis extremity 16 and shoulders 18 and 20. According to a preferred embodiment of the present invention, polymer is also applied along a short distance (on the order of about 10-30 thousandths of an inch) of major axis surfaces 17 and 19 in the regions abutting shoulders 18 and 20 to provide better adhesion of polymer layer 14A about the shoulders 18 and 20. Serrations 22 further assist with the adhesion of polymer layer 14A to minor axis extremity 16. While it is possible to perhaps apply a very thin layer of polymer in lower region 26, any application of polymer in this region detracts from the cost savings achieved by the instant invention and accordingly is recommended against.

As can be envisioned, in order for the product 10A described herein to survive the manufacturing processes involved in producing a transformer (winding, shipping, unwinding and wrapping), polymer layer 14A must be fairly adherent to core 12A. Additionally, the adhesion requirements of transformer manufacturers can vary. Such adhesion is controlled largely by the temperature of core 12A as it enters the polymer extrusion die. Thus, depending upon the requirements of a particular transformer manufacturer, the adhesion level can be tailored to their particular need.

Figure 4:
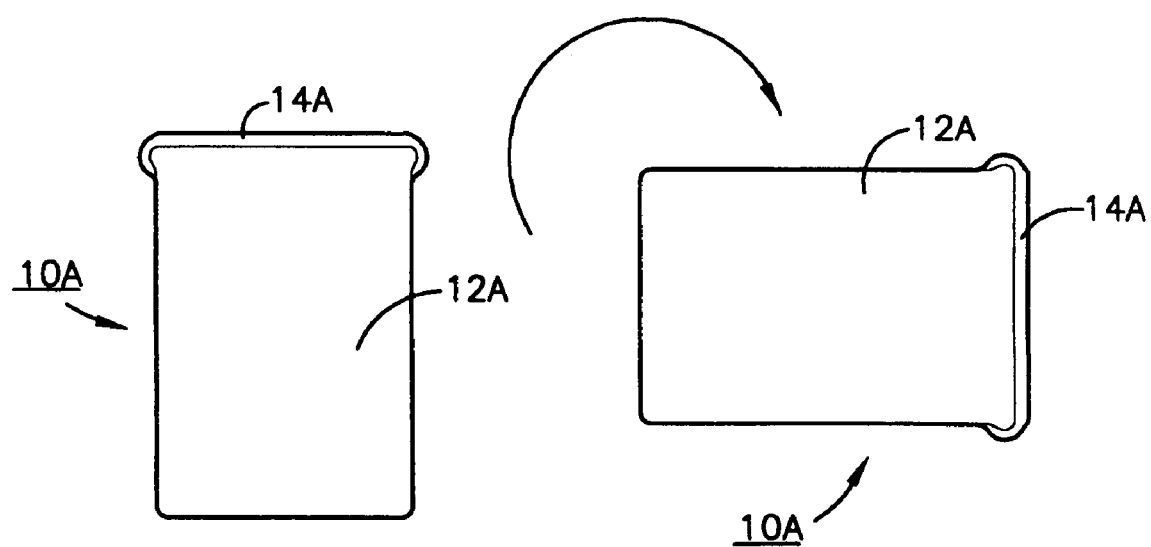
FIG. 4 is a schematic depiction of the magnet wire product orientation in one of the steps in the manufacture of magnet wire in accordance with the present invention.
Figure 5:
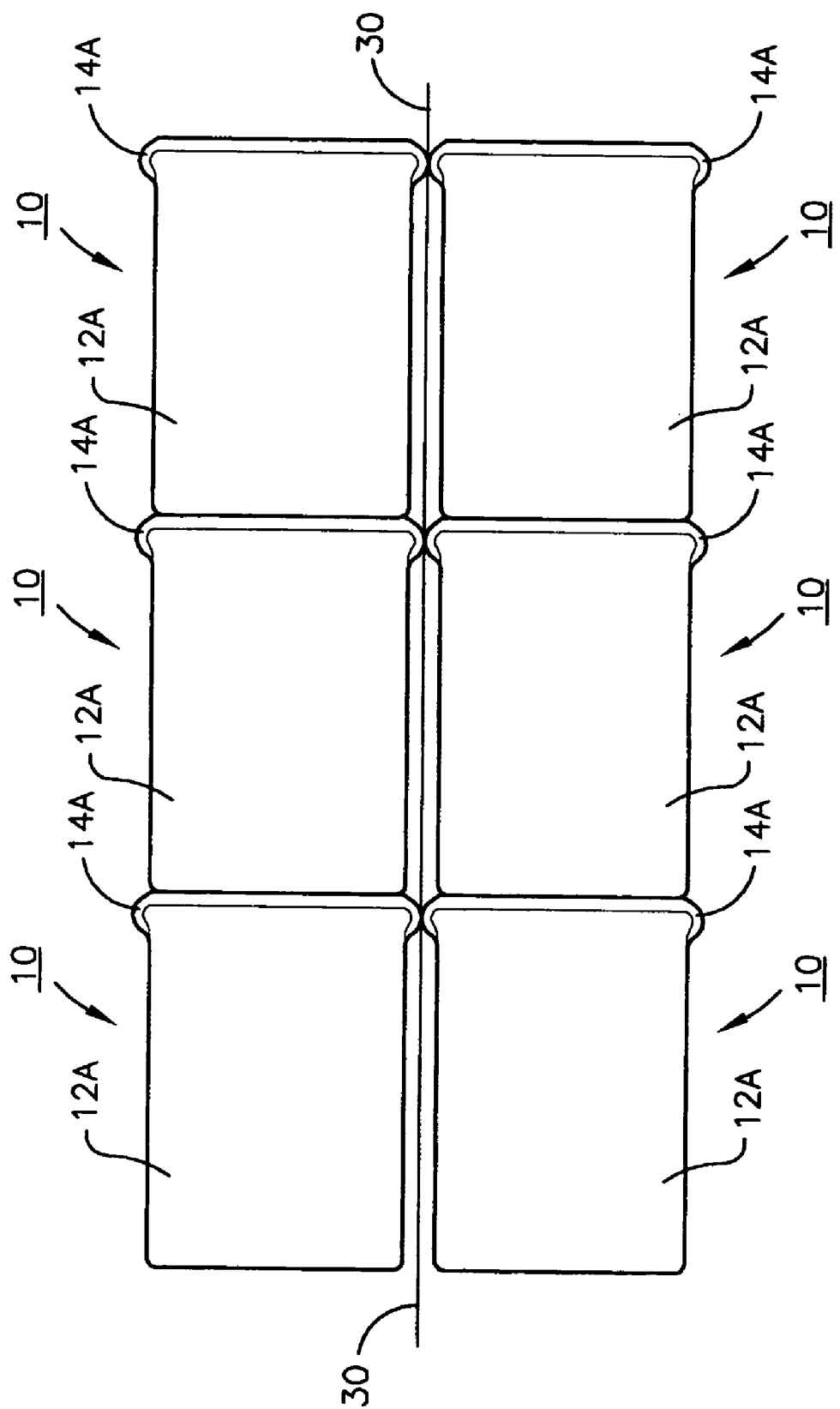
FIG. 5 is a side view showing the manner in which the magnet wire of the present invention is wound in the manufacture of electrical transformers.

As will be apparent to those skilled in the art to which the '147 patent and the instant application apply, while it is preferable to apply polymer layer 14A to core 12A with core 12A in the vertical position (that shown in the accompanying Figures wherein the minor axis extremity is at the top of the polymer extrusion die) 20 it is very difficult to coil the product on a continuous coiler of the type shown in the '147 patent in this configuration. Accordingly, in a preferred practice of the fabrication practice described herein, wire 10A is rotated 90 degrees as shown in FIG. 4 prior to coiling. This rotation results in a much more manageable coiling operation wherein the individual wraps of wire 10A appear as shown in FIG. 5 that depicts the wire configuration obtained when wire 10A is used to wind a transformer. As is seen from FIG. 5, when wire 10A is coiled in a transformer, polymer layer 14A forms the insulation between abutting wires 10A. The insertion of paper or other material interleaving 30 between adjacent overlapping layers in the conventional fashion allows for the conventional fabrication of a transformer from wire 10A all while reducing the cost of wire 10A by eliminating a substantial amount of the volume of insulating polymer 14A applied to wire 10A and used in the transformer wound using wire 10A.

Although a wide variety of polymeric materials can be applied to the wire, according to the preferred practice of the present invention for the manufacture of magnet wire useful particularly in the fabrication of high temperature transformers (180° C.+) the following polymers are preferred: RADELI® R; ACUDEL®; and HYFALON® the first two of which are polyphenylsulfones (of 180° C. and 220° C. capability respectively) and the third is a tetrafluoroethylene copolymer. All of these materials are commercially available from Solvay Advanced Polymers, LLC, 3702 Clanton Rd., Augusta, GA 30906.

Thus, what have been described are a novel single extremity coated magnet wire and a method for its production that result in the significant reduction of the amount of high cost insulating polymer that is applied to the wire and further result in a significant reduction in the cost of a transformer manufactured from the wire.

As the invention has been described, it will be apparent to those skilled in the art that the same may be varied in many ways without departing from the intended spirit and scope of the invention, and any and all such modifications are intended to be included within the scope of the appended claims.

What is claimed is:

1. A rectangular magnet wire having opposing major and minor axis extremities that include opposing major and minor axis surfaces and shoulders between said opposing major and minor surfaces and including at at least one of said minor axis extremities a layer of an insulating polymer that extends over said minor axis surface and said shoulders onto but not across either of said opposing major surfaces said insulating polymer comprising a member selected from the group consisting of polysulfone polymers and tetrafluoroethylene copolymers.

2. A method for the manufacture of a generally rectangular magnet wire comprising:

A) continuously extruding a generally rectangular conductive core having opposing minor axis extremities and opposing major axis surfaces; and B) in line extruding over at least one of said minor axis extremities a layer of an insulating polymer that extends over said at least one minor axis extremity and onto but not across said major axis surfaces.

3. The method of claim 2 further including opposing shoulders at said minor axis extremities.

4. The method of claim 3 wherein said layer of an insulating polymer extends over said opposing shoulders.

5. The method of claim 4 wherein said layer of an insulating polymer extends over said opposing shoulders and onto but not across either of said opposing major axis surfaces.

6. The method of claim 2 wherein said layer of an insulating polymer comprises a member selected from the group consisting of polysulfone polymers and tetrafluoroethylene copolymers.

* * * * *